United States Patent
Willette et al.

(10) Patent No.: US 12,458,714 B2
(45) Date of Patent: Nov. 4, 2025

(54) ICE MACHINE WITH ULTRAVIOLET LIGHT SOURCE

(71) Applicant: Triatomic Environmental, Inc., Jupiter, FL (US)

(72) Inventors: Christopher C. Willette, Jupiter, FL (US); Aaron Engel, Dollard-des-Ormeaux (CA)

(73) Assignee: DiversiTech Corporation, Duluth, GA (US)

( * ) Notice: Subject to any disclaimer, the term of this patent is extended or adjusted under 35 U.S.C. 154(b) by 331 days.

(21) Appl. No.: 17/164,272

(22) Filed: Feb. 1, 2021

(65) Prior Publication Data
US 2021/0236671 A1    Aug. 5, 2021

Related U.S. Application Data

(60) Provisional application No. 62/968,704, filed on Jan. 31, 2020.

(51) Int. Cl.
*A61L 2/10* (2006.01)
*F25C 1/00* (2006.01)

(52) U.S. Cl.
CPC ....... *A61L 2/10* (2013.01); *F25C 1/00* (2013.01); *A61L 2202/11* (2013.01); *A61L 2202/14* (2013.01)

(58) Field of Classification Search
CPC .... A61L 2/10; A61L 2202/11; A61L 2202/14; F25C 1/00; F25C 5/182; F25C 2400/12; F25D 2317/0417
USPC .......................................................... 62/66
See application file for complete search history.

(56) References Cited

U.S. PATENT DOCUMENTS

| | | | | |
|---|---|---|---|---|
| 2,068,212 A | * | 1/1937 | Whitman | F25D 17/042 15/257.1 |
| 2,722,110 A | * | 11/1955 | Denzer | F25C 1/045 62/352 |
| 3,618,733 A | * | 11/1971 | Winsett | G07F 17/0071 194/242 |
| 3,955,922 A | * | 5/1976 | Moulthrop | A61L 2/10 312/31 |
| 4,276,750 A | * | 7/1981 | Kawasumi | F25C 5/142 62/320 |
| 5,908,494 A | * | 6/1999 | Ross | B01D 50/60 55/440 |
| 6,132,929 A | | 10/2000 | Nakamura | |
| 6,241,893 B1 | | 6/2001 | Levy | |
| 6,305,177 B1 | | 10/2001 | Edwards | |

(Continued)

FOREIGN PATENT DOCUMENTS

| | | | | |
|---|---|---|---|---|
| CN | 1611870 A | * | 5/2005 | F28F 19/02 |
| CN | 105540961 A | * | 5/2016 | C02F 9/00 |

(Continued)

OTHER PUBLICATIONS

DE 202020101654U1—machine translation (Year: 2023).*

(Continued)

*Primary Examiner* — Eric S Ruppert
*Assistant Examiner* — Kirstin U Oswald
(74) *Attorney, Agent, or Firm* — Dentons US LLP (57) ABSTRACT

A UV LED ice disinfecting device. The UV LED ice device is designed to disinfect or sterilize ice, particularly ice made and dispensed from an ice making machine.

15 Claims, 7 Drawing Sheets

(56) References Cited

U.S. PATENT DOCUMENTS

| | | | |
|---|---|---|---|
| 6,500,387 B1* | 12/2002 | Bigelow | A61L 9/20 |
| | | | 55/286 |
| 6,506,428 B1 | 1/2003 | Berge | |
| 6,599,618 B1 | 7/2003 | Simmon, Jr. | |
| 6,904,946 B2 | 6/2005 | James | |
| 6,924,495 B1* | 8/2005 | Brickley | F24F 8/192 |
| | | | 313/26 |
| 6,967,008 B1 | 11/2005 | Barnes | |
| 7,029,587 B2 | 4/2006 | Andrews | |
| 7,421,851 B2 | 9/2008 | Witham | |
| 8,387,405 B2* | 3/2013 | Johnson | F25D 17/042 |
| | | | 62/177 |
| 9,878,061 B2* | 1/2018 | Shur | F25D 11/00 |
| 10,206,525 B2 | 2/2019 | Huffar | |
| 10,674,841 B2 | 6/2020 | Huffar | |
| 11,076,710 B2 | 8/2021 | Huffar | |
| 11,388,789 B2 | 7/2022 | Nickles | |
| 11,419,435 B2 | 8/2022 | Huffar | |
| 2002/0171368 A1* | 11/2002 | Little | H05B 41/3922 |
| | | | 315/149 |
| 2005/0169821 A1* | 8/2005 | Boschert | B60H 3/0078 |
| | | | 422/186.07 |
| 2005/0186108 A1* | 8/2005 | Fields | A61L 2/202 |
| | | | 422/123 |
| 2006/0207267 A1 | 9/2006 | Erdman | |
| 2006/0260341 A1* | 11/2006 | Meyvis | B01D 46/12 |
| | | | 62/331 |
| 2008/0066628 A1* | 3/2008 | Qian | A23C 9/1226 |
| | | | 99/453 |
| 2008/0145960 A1 | 6/2008 | Kolodin | |
| 2009/0142225 A1* | 6/2009 | Tornqvist | A61L 2/202 |
| | | | 62/78 |
| 2009/0183523 A1* | 7/2009 | Willette | F25C 1/045 |
| | | | 62/340 |
| 2011/0041542 A1* | 2/2011 | Brunner | F25C 5/142 |
| | | | 62/498 |
| 2012/0025104 A1* | 2/2012 | Park | F25D 17/042 |
| | | | 250/492.1 |
| 2014/0060095 A1* | 3/2014 | Shur | A61L 2/10 |
| | | | 250/455.11 |
| 2015/0362243 A1* | 12/2015 | Ko | F25C 1/10 |
| | | | 62/346 |
| 2016/0113422 A1* | 4/2016 | Huffar | G06Q 20/18 |
| | | | 705/23 |
| 2016/0341467 A1* | 11/2016 | Mitchell | F25D 17/042 |
| 2018/0264150 A1* | 9/2018 | Shur | H04N 7/183 |

FOREIGN PATENT DOCUMENTS

| | | | | |
|---|---|---|---|---|
| CN | 206683305 U1 | * | 11/2017 | |
| DE | 202020101654 U1 | * | 4/2020 | F25C 5/24 |
| EP | 3922936 | | 12/2021 | |
| JP | H11272946 A1 | * | 10/1999 | |
| JP | 2000084146 A | * | 3/2000 | G07F 9/04 |
| JP | 2002350031 A | * | 12/2002 | |
| JP | 2006046813 A | * | 2/2006 | |
| JP | 2019116991 A | * | 7/2019 | |
| KR | 20130070972 A | * | 6/2013 | F25D 29/00 |
| KR | 101552059 B1 | * | 9/2015 | |
| WO | WO2015032682 | | 3/2015 | |
| WO | WO2019075754 | | 4/2019 | |
| WO | WO-2019127237 A1 | * | 7/2019 | A23B 2/53 |

OTHER PUBLICATIONS

JP2006046813A—machine translation (Year: 2023).*
JP-2000084146-A—machine translation (Year: 2023).*
WO-2019127237-A1, machine translation (Year: 2023).*
CN 206683305 U1, machine translation (Year: 2023).*
KR 101552059 B1, machine translation (Year: 2023).*
KR 20130070972 A, machine translation (Year: 2023).*
Cn 105540961A machine translation (Year: 2024).*
CN 1611870A machine translation (Year: 2024).*
JPH11272946a1, machine translation (Year: 2024).*
JP 2002350031 AH machine translation (Year: 2024).*
JP-2019116991-A, machine (Year: 2024).*
U.S. Appl. No. 10/849,442, filed Dec. 1, 2020, William M. Huffar.

* cited by examiner

ICE MACHINE WITH ULTRAVIOLET LIGHT SOURCE

CROSS REFERENCE TO RELATED APPLICATION

In accordance with 37 C.F.R 1.76, a claim of priority is included in an Application Data Sheet filed concurrently herewith. Accordingly, the present invention claims priority under 35 USC 119(e) to the U.S. Provisional Application 62/968,704, filed on Jan. 31, 2020, entitled "ICE LED UV", the contents of which are herein incorporated by reference.

FIELD OF THE INVENTION

The present invention is related to devices and methods of disinfecting or sterilizing surfaces; cabinetry; condensation; refrigeration equipment; to devices and methods for disinfecting or sterilizing solid forms of water; and more particularly, to devices and methods of disinfecting or sterilizing frozen water made in an ice maker.

BACKGROUND OF THE INVENTION

Frozen water, or ice, is very important to many different industries. In the health care industry, it may be used to prevent swelling or prevent further damage to an injured limb or body part. It may even be used to keep medical equipment or drugs safe for human use. In the hospitality and foodservice industries, ice may play an important role in keeping food safe from bacteria during the food preparation and delivery process, or simply be used to chill drinks or make frozen cocktails.

One of the most common ways of producing ice is through the use of ice machines. Whether for commercial or residential use, ice machines are designed to draw in water, freeze the water from a liquid to a solid state, store the ice, and possibly dispense the ice when required. While such operations seem simple, ice machines are known to have issues related to contamination. As a result of the interior environmental conditions of an ice machine, the equipment is commonly a source of microbial contamination that can easily cross contaminate the ice, water and may very well be a source of airborne pathogens that can easily migrate from the confines of the equipment and pose a risk to occupants. Whether receiving contaminated water supplied to the ice making unit or having contamination in the storage bin, the end user is typically unaware of the associated contamination. Moreover, in a typical use, many individuals access ice stored in ice machines. While some may exercise proper technique, many others fail to practice the necessary preventative maintenance, clean techniques and contaminate the entire ice bin. Because it can be time consuming to continuously clean interior surfaces where the ice is formed and empty and clean the ice bins, any contamination within the equipment and bin may continually perpetuate the contamination issue.

SUMMARY OF THE INVENTION

The present invention relates to a device and methods for disinfecting surfaces within the equipment, stagnant water and condensation, refrigeration components, ice, particularly ice made and dispensed from an ice making machine.

Accordingly, it is an objective of the invention to provide devices and methods for disinfecting or sterilizing surfaces and solid forms of water.

It is a further objective of the invention to provide devices and methods for disinfecting surfaces or sterilizing frozen water.

It is yet another objective of the invention to provide devices and methods for disinfecting or sterilizing ice made or stored in an ice making machine.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1A:
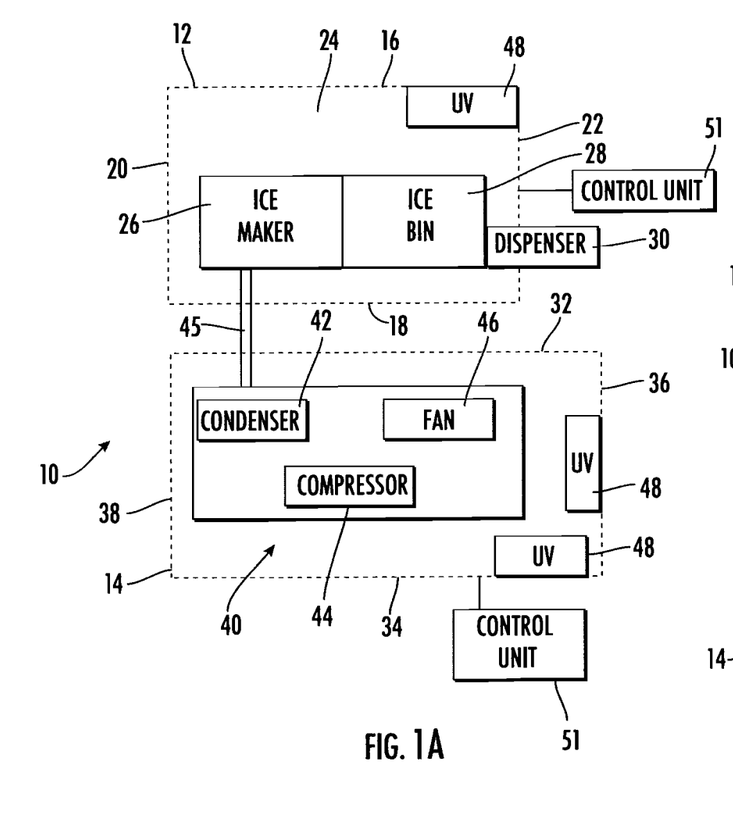
FIG. 1A is a schematic illustration of a standalone UV ice machine.

The present invention relates to a device and methods for disinfecting ice machine surfaces and ice making components, condensation, ice, particularly ice made and dispensed from an ice making machine. Referring to FIG. 1, a schematic representation of a standalone ice machine configured to disinfect ice, referred to generally as a UV LED ice disinfection device 10, is shown. The UV LED ice disinfection device 10 is configured to make and dispense ice. To maintain a clean environment, the UV LED ice disinfection device 10 is also configured to prevent or reduce slime, pathogen, or other microbial contamination from one or more, preferably all, areas of the UV LED ice disinfection device 10. Referring to FIG. 1A, a schematic representation of the UV LED ice disinfection device 10 illustrated as a standalone unit is shown. The UV LED ice disinfection device 10 shown may include a first ice storage compartment 12 and a second ice hardware compartment 14. The first ice storage compartment 12 may have a plurality of walls 16, 18, 20 and 22 secured together to form an interior 24. The first ice storage compartment interior 24 houses an ice making machine 26 as known to one of skill in the art, and a storage area or bin 28. The first ice storage compartment 12 may also include a dispensing unit 30 configured for dispensing ice or water.

The second ice hardware compartment 14 may have a plurality of walls 32, 34, 36, and 38 secured together to form an interior 40. The second ice hardware compartment interior 40 houses one or more hardware components necessary for making ice, such as a condenser 42, a compressor 44, and a fan 46. Plumbing, such as pipe 45 may direct water to the ice making machine 26.

To provide a disinfecting system and method for maintaining a clean environment, the UV LED ice disinfection device 10 may include a disinfecting device, illustrated herein as a UV LED unit 48 (provide UV light in a UV spectrum 100 nm-700 nm). The UV LED unit 48 may be a standalone unit capable of producing UV light. Alternatively, a control unit 51, see FIGS. 1A, 12b, 2A, or 2B with a power source (not shown) may be placed in the first ice storage compartment interior 24, the second ice hardware compartment interior 40, or both. The UV LED unit 48 may be placed in one or more locations within the first ice storage compartment interior 24 or the second ice hardware compartment interior 40. Such position may be on any one or more of the first ice storage compartment walls 16, 18, 20 and 22. The UV LED unit 48 may also be positioned or located on any one or more of the second ice hardware compartment walls 32, 34, 36, and 38. Alternatively, or in addition to, the UV LED unit 48 may be positioned or located on other structures within the first ice storage compartment interior 24 or the second ice hardware compartment interior 40, such as a shelf or bracket (not shown in FIG. 1A). The UV LED unit 48 is designed or arranged so as to expose the first ice storage compartment interior 24 or the second ice hardware compartment interior 40, and any devices housed therein, to UV light.

Figure 1B:
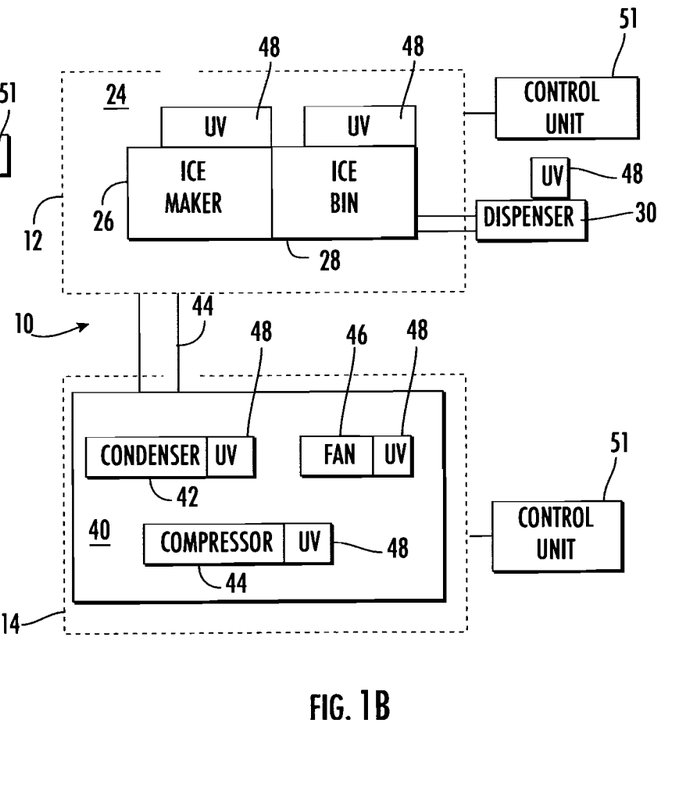
FIG. 1B is an alternative embodiment of the standalone UV ice machine.

FIG. 1B illustrates an embodiment of the UV LED ice disinfection device 10 with the UV LED unit 48 secured to or placed on the individual components responsible for making ice. As shown in FIG. 1B, instead of placing the UV LED units 48 within the first ice storage compartment interior 24 or the second ice hardware compartment interior 40, one or more components may have one or more UV LED units 48. As shown in the first ice storage compartment interior 24, the ice maker 26, ice bin 28, and dispenser 30 have individual UV LED units 48 for disinfecting/sanitizing each specific device or area near the device. The condenser 42, a compressor 44, and a fan 46 located within the second ice hardware compartment interior 40 may each include one or more UV LED units 48 for disinfecting/sanitizing each specific device or area near the device as well. While FIG. 1B illustrates all of the devices containing one or more UV LED units 48, any combination may be used, i.e. ice maker 26 and ice bin 28 comprise individual UV LED units 48, or just the condenser 42, compressor 44, and ice bin 28 comprise individual UV LED units 48.

Figure 2A:
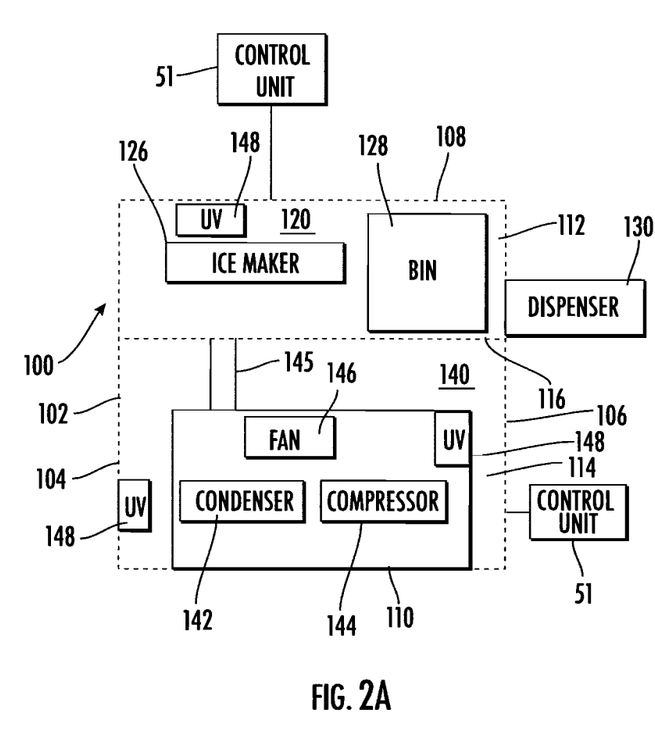
FIG. 2A is a schematic illustration of a table top UV ice machine.

Referring to FIG. 2A, a schematic representation of the UV LED ice disinfection device, illustrated as a table top unit, referred to as UV LED ice disinfection table top device 100, is shown. The UV LED ice disinfection table top device 100 may include a single housing unit 102 having walls 104, 106, 108 and 110. A first ice storage compartment 112 and a second ice hardware compartment 114 may be separated by a surface 116. The first ice storage compartment 112 may comprise an interior 120. The first ice storage compartment interior 120 houses an ice making machine 126 as known to one of skill in the art, and a storage area or bin 128. The first ice storage compartment 112 may also include a dispensing unit 130 configured for dispensing ice or water.

The second ice hardware compartment 114 may have an interior 140 housing one or more hardware components necessary for making ice, such as a condenser 142, a compressor 144, and a fan 146. Plumbing, such as pipe 145 may direct water to the ice making machine 126.

To provide a disinfecting system and method for maintaining a clean environment, the UV LED ice disinfection table top device 100 may include a disinfecting device, illustrated herein as a UV LED unit 148. The UV LED unit 148 may be a standalone unit capable of producing UV light. Alternately, a control unit 51 with a power source (not shown) may be placed in the first ice storage compartment interior 120, the second ice hardware compartment interior 140, or both. The UV LED unit 148 may be placed in one or more locations within the first ice storage compartment interior 120 or the second ice hardware compartment interior 140. Such position may be on any one or more of the walls 104, 106, 108, 110, or dividing surface 116. The UV LED unit 148 may also be positioned or located anywhere with the second ice hardware compartment 114. Alternatively, or in addition to, the UV LED unit 148 may be positioned or located on other structures within the first ice storage compartment interior 120 or the second ice hardware compartment interior 140, such as a shelf or bracket (not shown in FIG. 2A). The UV LED unit 148 is designed or arranged so as to expose the first ice storage compartment interior 120 or the second ice hardware compartment interior 140, and any devices housed therein, to UV light.

Figure 2B:
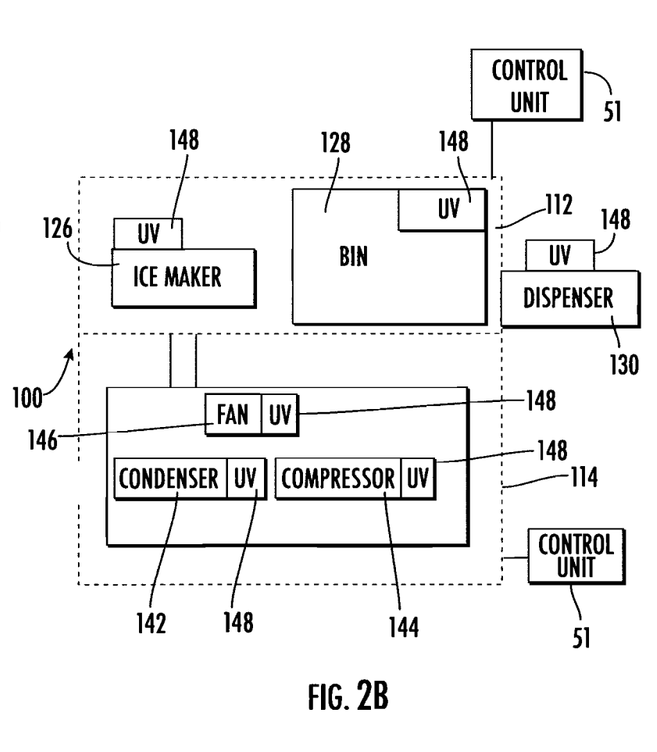
FIG. 2B is a schematic illustration of a table top UV ice machine.

FIG. 2B illustrates an embodiment of the UV LED ice disinfection table top device 100 with the UV LED unit 148 secured to or placed on the individual components responsible for making ice. As shown, instead of placing the UV LED units 148 within the first ice storage compartment interior 120 or the second ice hardware compartment interior 140, one or more components may have one or more UV LED units 148. As shown in the first ice storage compartment interior 120, the ice maker 126, ice bin 128, and dispenser 130 have individual UV LED units 148 for disinfecting/sanitizing each specific device or area near the device. The condenser 142, a compressor 144, and a fan 146 located within the second ice hardware compartment interior 140 may each include one or more UV LED units 148 for disinfecting/sanitizing each specific device or area near the device as well. While FIG. 2B illustrates all of the devices contain one or more UV LED units 148, any combination may be used, i.e. ice maker 126 and ice bin 128 comprise individual UV LED units 148, or just the condenser 142, compressor 144, and ice bin 128 comprise individual UV LED units 148.

Figure 3:
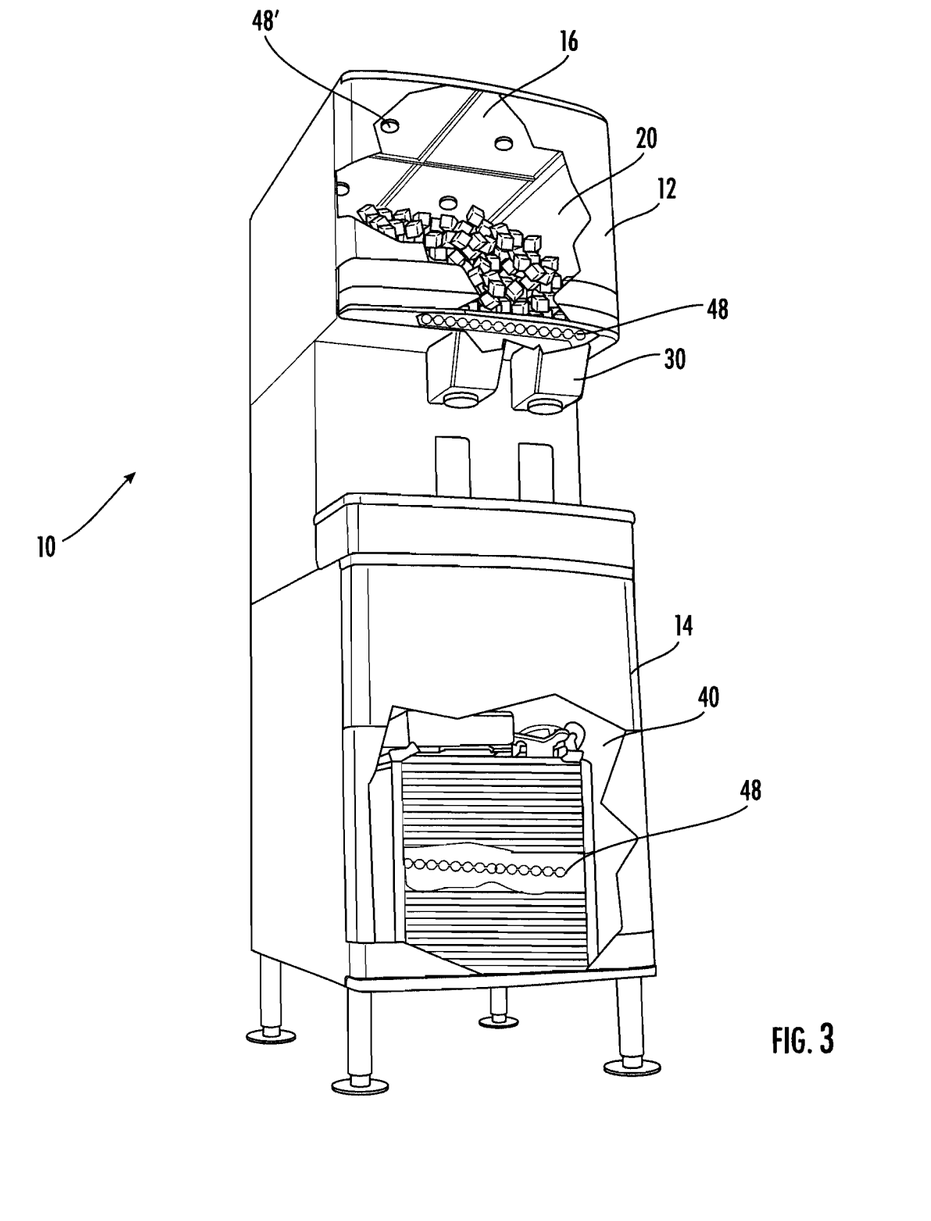
FIG. 3 is a partial cut away view of an illustrative example of a standalone UV ice machine.

FIG. 3 illustrates the UV LED ice disinfection device 10 presented in FIG. 1A or FIG. 1B. As illustrated in the Figures, the UV LED units 48 are shown positioned within the second ice hardware compartment 40. In this case, the UV LED units 48 are secured to or positioned on the condenser 42. FIG. 3 also illustrates the UV LED units 48 located in the first ice storage compartment interior 24. As shown, the UV LED units 48 are placed or secured to an upper wall 16 and at or near the dispenser 30. As shown, the UV LED units 48 at the dispenser 30 are shown as a strip or row of UV LED lights, whereas the UV LED lights on upper wall 16 are UV LED waterproof modules 48'. The UV LED waterproof modules 48' may be pre-installed into a "universal" sump that will accommodate the ice dispenser. To ease installation, the universal sump with LED disinfecting waterproof modules 48' may be designed to easily replace the original sump allowing for a quick and simple installation.

Figure 4:
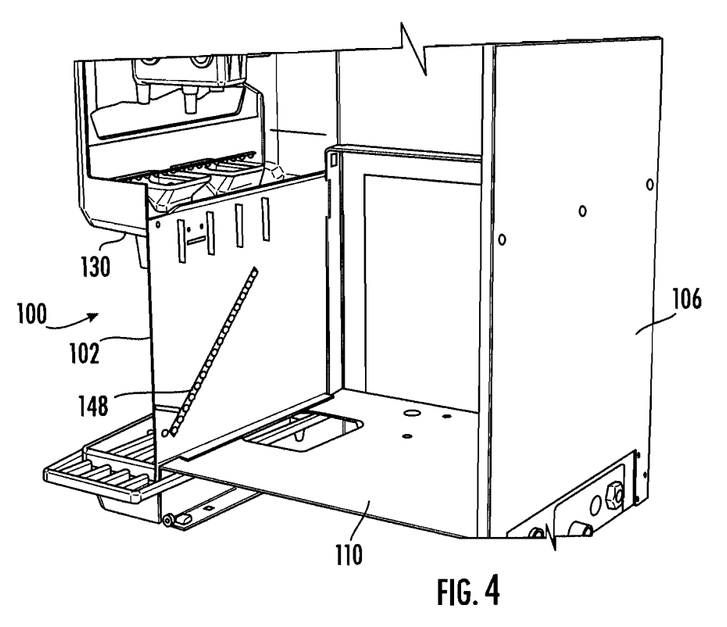
FIG. 4 shows an illustrative example of a standalone UV ice machine with the ice making components removed.
Figure 5:
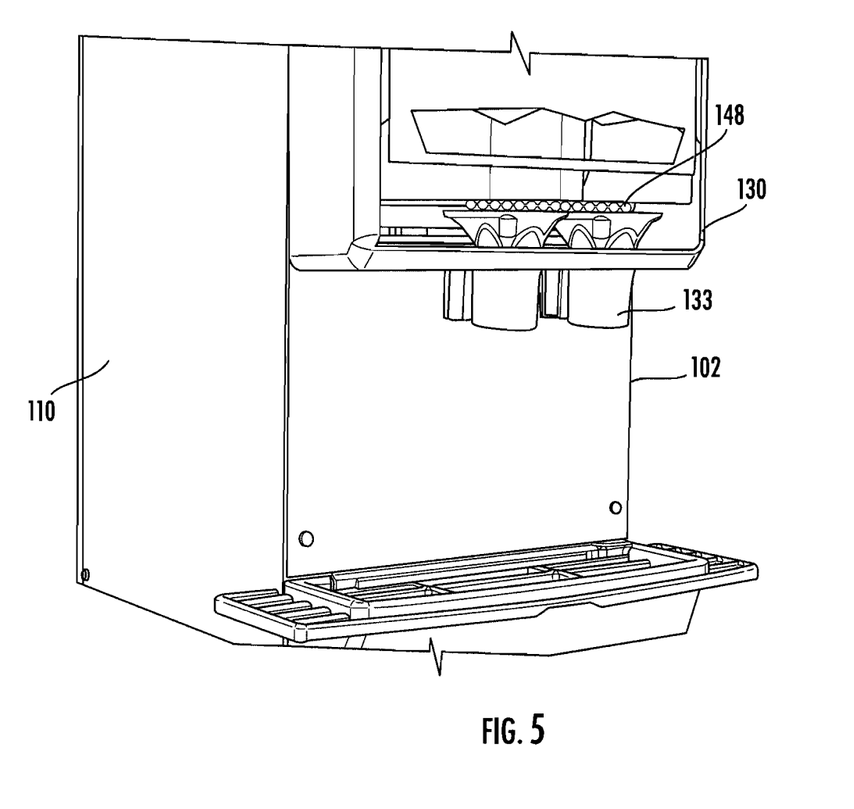
FIG. 5 is a view of the dispensing component of the standalone UV ice machine exposed to UV disinfecting light.
Figure 6:
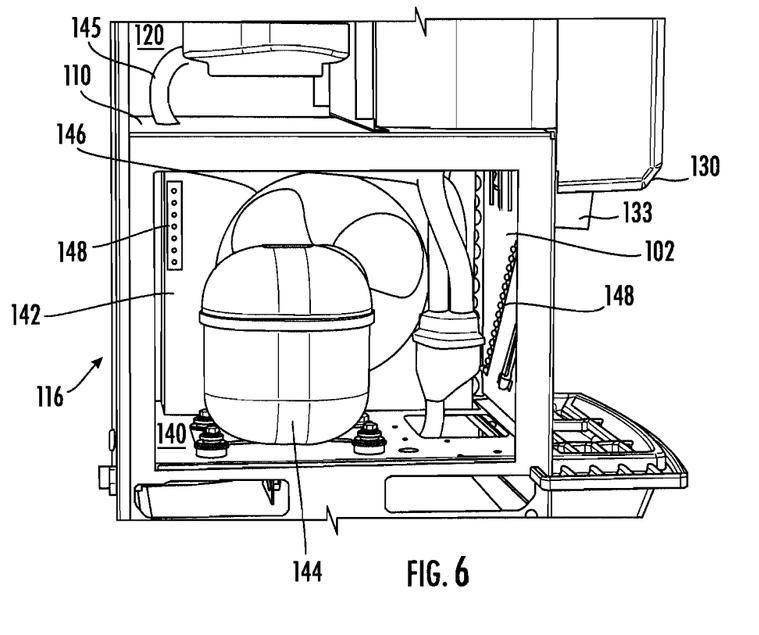
FIG. 6 illustrates several ice making components of the standalone UV ice machine exposed to UV light.

Referring to FIGS. 4-6, an illustrative example of the UV LED ice disinfection table top device 100 presented in FIG. 2A or FIG. 2B is shown. Referring to FIG. 4, the second ice hardware compartment interior 140 is shown without any of the hardware devices. A UV LED unit 148, illustrated as a strip of UV LED lights, is shown secured to wall 102. Referring to FIGS. 4 and 5, the UV LED unit 148 is shown positioned or secured to the dispensing unit 130, exposing UV light to the dispensing unit ice chutes 133. In FIG. 6, UV LED units 148 are shown applied or secured to wall 102 and to the condenser 142.

Figure 7A:
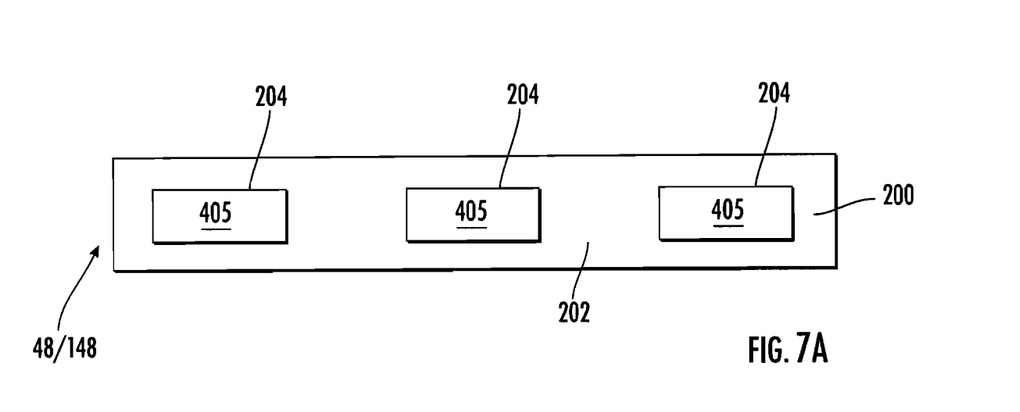
FIG. 7A is an illustrative example of a UV LED strip.
Figure 7B:
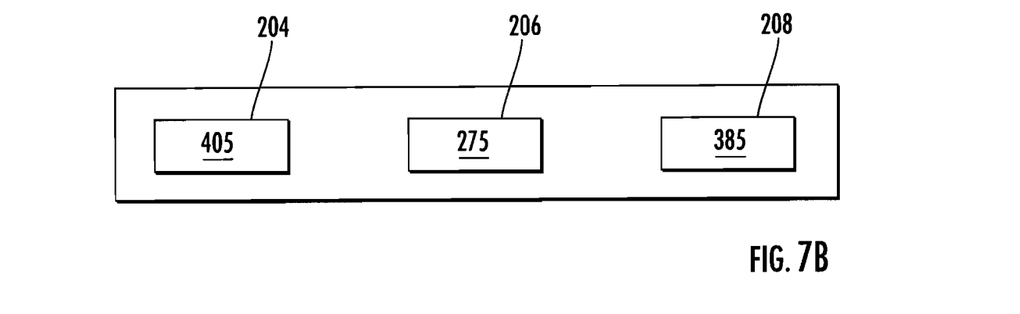
FIG. 7B is an illustrative example of a hybrid UV LED strip.

Referring to FIG. 7A, an illustrative example of the UV LED unit 48/148 is shown as a strip 200. The UV LED strip 200 may be configured as a flexible circuit board with surface mounted UV LEDS boards 204 to produce UV light. Alternatively, the UV LED unit 48/148 may be a plurality of individual UV LED units strung together. As shown in FIG. 7A, the UV LEDs all emit a single frequency, such as 405 nm. FIG. 7B illustrates the UV hybrid UV LED strip 200 comprised of UV LED diodes emitting different frequencies, such as frequency of 405 nm (diode 204), frequency of 275 nm (diode 206), and a frequency of 385 nm (diode 208) Accordingly, the UV LED ice disinfection device 10/100 may be configured to expose one or more surfaces to UV light to different UV wavelengths. The UV LED ice disinfection device 10/100 may be comprised of control units 51 to 1) expose one surface area or hardware component or device to a specific UV wavelength (say 405) and another surface area or hardware component or device to a different specific UV wavelength(s) (275 OR 385), 2) cause the hybrid UV LED strip 200 to emit different UV wavelengths at different times or for different amounts of time, or 3) provide cycles of exposure to one or more UV wavelengths. The UV LED unit 48/148 may be designed to emit light continuously or in pulses, or intermittingly based on predetermined times. The UV LED unit 48/148 may also be configured to be tuned on/off at different times in the ice making cycle, such as when water is being pumped into the ice maker 26 or when entering the UV LED ice disinfection device 10, during the ice making process, when the ice is completed, when the ice is completed and dumped into the ice bin 28. Any other time. If the UV LED ice disinfection device 10 utilizes a water return (for ice that not sued and/or melts), UV LED unit 48/148 might be tuned on or cycled to disinfect the return water prior to return to the ice maker 26.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device, comprising:
    an ice machine that is standalone, wherein the ice machine includes a chute that gravitationally dispenses an ice, an area that receives the ice before the ice is gravitationally dispensed, and an interior compartment positioned underneath the area, wherein the interior compartment hosts a condenser, a fan, and a compressor, wherein the condenser, the fan, and the compressor enables the ice to be made, wherein the compressor is positioned frontal to the condenser when the ice machine is upright, wherein the fan is positioned above the compressor when the ice machine is upright, wherein the fan is positioned coplanar with or above the condenser when the ice machine is upright; and
    a source of an ultraviolet (UV) light directing the UV light at the ice machine, wherein at least one of
        (a) the ice machine includes an ice bin at which the UV light is directed and a dispenser, wherein the ice bin includes a front portion and a middle portion, wherein the middle portion follows the front portion, wherein the front portion is positioned over the dispenser when the ice machine is upright, wherein the front portion is lower than the middle portion such that the ice falls into the front portion from the middle portion before being gravitationally dispensed by the dispenser;
        (b) the UV light is directed at the condenser, wherein the ice machine includes a wall to which the source of UV light is secured;
        (c) the source of the UV light directing the UV light at the compressor to illuminate the compressor; or
        (d) the UV light is directed at the fan, wherein the fan is attached to or integral with the source of the UV light.

2. The device of claim 1, wherein the ice machine includes a dispenser at which the UV light is directed.

3. The device of claim 1, wherein the UV light is directed at the chute.

4. The device of claim 1, wherein the ice machine includes the ice bin at which the UV light is directed, wherein the ice bin includes the front portion and the middle portion, wherein the middle portion follows the front portion, wherein the front portion is positioned over the dispenser when the ice machine is upright, wherein the front portion is lower than the middle portion such that the ice falls into the front portion from the middle portion before being gravitationally dispensed by the dispenser.

5. The device of claim 1, wherein the UV light is directed at the condenser, wherein the ice machine includes the wall to which the source of the UV light is secured.

6. The device of claim 1, wherein the source of the UV light directing the UV light at the compressor to illuminate the compressor.

7. The device of claim 1, wherein the UV light is directed at the fan, wherein the fan is attached to or integral with the source of the UV light.

8. The device of claim 1, wherein the fan is positioned coplanar with the condenser when the ice machine is upright.

9. The device of claim 1, wherein the fan is positioned above the condenser when the ice machine is upright.

10. A method, comprising:

causing a user to enable a source of an ultraviolet (UV) light to direct the UV light at an ice machine that is standalone and includes a chute that gravitationally dispenses an ice, an area that receives the ice before the ice is gravitationally dispensed, and an interior compartment positioned underneath the area, wherein the interior compartment hosts a condenser, a fan, and a compressor, wherein the condenser, the fan, and the compressor enables the ice to be made, wherein the compressor is positioned frontal to the condenser when the ice machine is upright, wherein the fan is positioned above the compressor when the ice machine is upright, wherein the fan is positioned coplanar with or above the condenser when the ice machine is upright, wherein at least one of (a) the ice machine includes an ice bin at which the UV light is directed and a dispenser, wherein the ice bin includes a front portion and a middle portion, wherein the middle portion follows the front portion, wherein the front portion is positioned over the dispenser when the ice machine is upright, wherein the front portion is lower than the middle portion such that the ice falls into the front portion from the middle portion before being gravitationally dispensed by the dispenser;

(b) the UV light is directed at the condenser, wherein the ice machine includes a wall to which the source of UV light is secured;

(c) the source of the UV light directing the UV light at the compressor to illuminate the compressor; or (d) the UV light is directed at the fan, wherein the fan is attached to or integral with the source of the UV light.

11. The method of claim 10, wherein the ice machine includes the ice bin at which the UV light is directed, wherein the ice bin includes the front portion and the middle portion, wherein the middle portion follows the front portion, wherein the front portion is positioned over the dispenser when the ice machine is upright, wherein the front portion is lower than the middle portion such that the ice falls into the front portion from the middle portion before being gravitationally dispensed by the dispenser.

12. The method of claim 10, wherein the UV light is directed at the condenser, wherein the ice machine includes the wall to which the source of the UV light is secured.

13. The method of claim 10, wherein the source of the UV light directing the UV light at the compressor to illuminate the compressor.

14. The method of claim 10, wherein the fan is positioned coplanar with the condenser when the ice machine is upright.

15. The method of claim 10, wherein the fan is positioned above the condenser when the ice machine is upright.

\* \* \* \* \*